Sept. 22, 1942. B. G. HORSTMANN 2,296,788
POWER TRANSMISSION MECHANISM
Filed Nov. 3, 1941 2 Sheets-Sheet 2
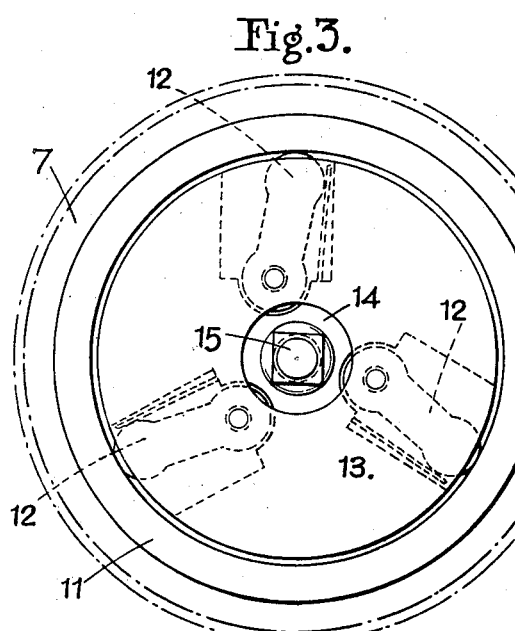
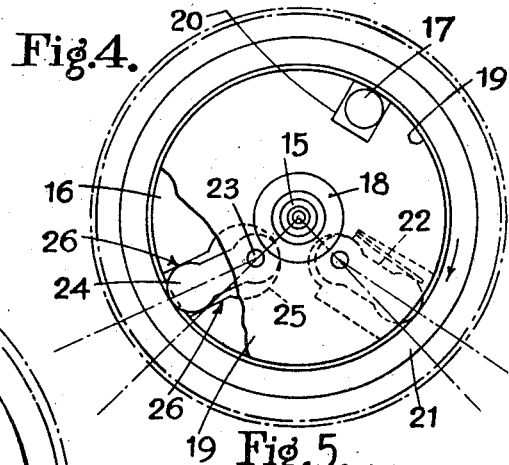
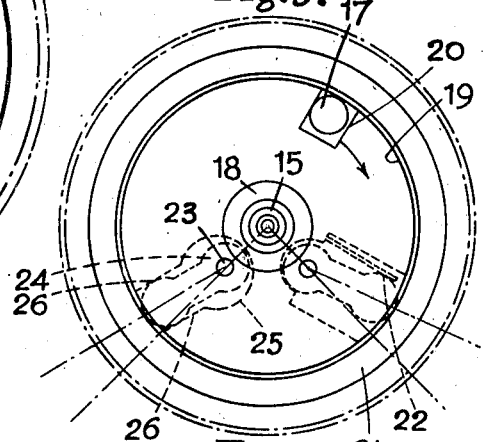
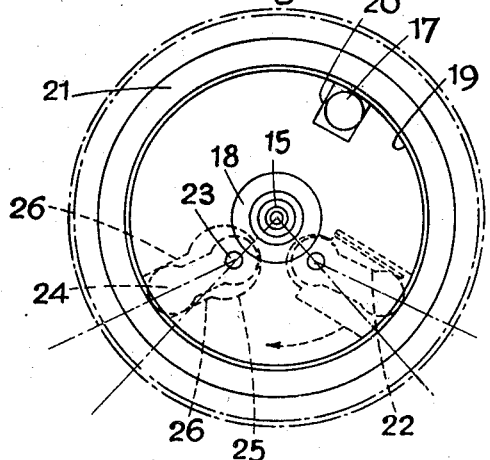
INVENTOR
B. G. HORSTMANN Patented Sept. 22, 1942

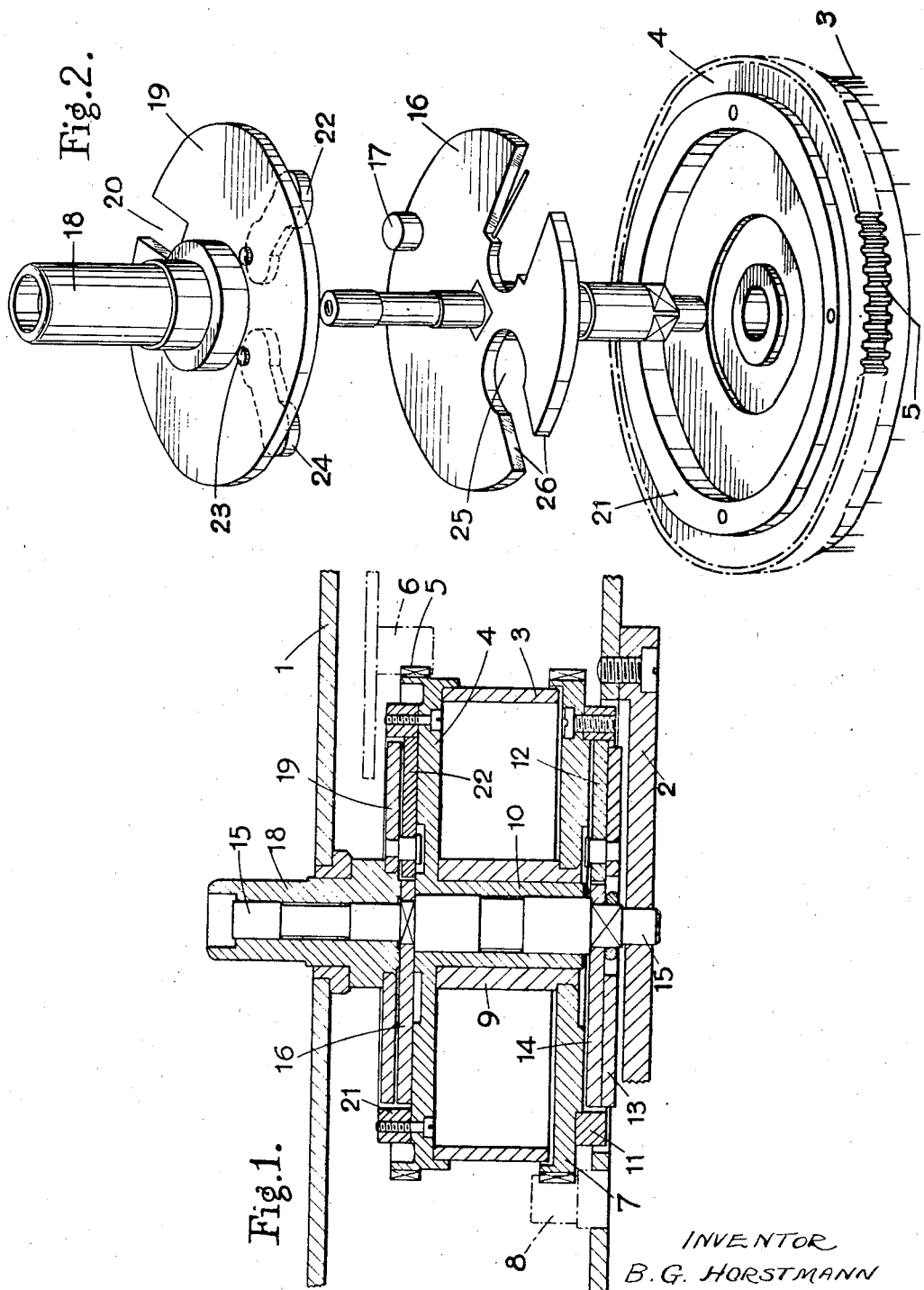

2,296,788

UNITED STATES PATENT OFFICE 2,296,788

POWER TRANSMISSION MECHANISM

Bevan Graham Horstmann, Newbridge, Bath, England

Application November 3, 1941, Serial No. 417,692
In Great Britain March 19, 1940

4 Claims. (Cl. 185—43)

This invention relates to power transmission devices and has for its general object to enable an output member to be driven in one direction through respective transmission trains from one or the other of two alternative sources of drive, providing at the same time for preventing the output member from overrunning its drive under any outside influence. It is obvious that, for the purpose of independent driving from such a pair of alternative sources, each of the transmission trains must include means for rendering the transmitted drive unidirectional, and thus without the present invention the output member would be free to overrun its drive should the particular source which happens to be operating stop or slow down. Moreover, if forces other than those emanating from the sources of drive were applied to the output member in its normal running direction it would be free to rotate even if its driving means were at rest and as stated it is one of the objects of the invention to prevent such free-wheeling or overrunning of the output member.

The invention may be usefully applied for example to a time-control device adapted to operate valves or switches at pre-determined times. One known form of such a time-control device utilizes two alternative sources of drive for the output member, namely a synchronous electric motor which is a primary source of drive and a spring clockwork which is a stand-by or secondary source of drive. As the drive from the synchronous motor and the clockwork to the output member are alternative, the respective transmission trains must include unidirectional or free-wheel elements, so that the drive may be continued by one source should the other stop or fail and such unidirectional elements would of course normally allow the output member to overrun its drive, which in practice it is apt to do in certain circumstances. The present invention intends to preclude such possibilities since overrunning of the output member would of course seriously upset the accuracy of the time setting in time-control apparatus of this nature.

According to the invention, in a power transmission device there is provided an output member, a transmission train transmitting unidirectional drive to the output member from one source of drive, a transmission train transmitting unidirectional drive to the output member from another source of drive and an anti-overrun device in at least one of the transmission trains for preventing the driven member from overrunning its drive.

An embodiment of the invention as applied to a time-control device is illustrated in the accompanying drawings, wherein:

Figure 1 is a diagrammatic sectional view,

Figure 2 is a perspective view with certain parts omitted, the parts shown being spaced apart to facilitate understanding, Figure 3 is an inverted plan view, and Figures 4 to 6 are diagrams showing the relative positions of the parts during various conditions of operation as will be explained hereinafter.

Referring to the drawings, and more particularly to Figures 1 to 3, there is mounted between fixed framework plates 1 and 2 the barrel 3 of a spring clockwork motor which constitutes the secondary source of drive. The barrel 3 has secured to it at one end a plate 4 formed on its periphery with a series of gear teeth 5 meshing with the final gear 6 of an escapement train which regulates the movement of the barrel in the usual manner.

At the other end of the barrel 3 there is mounted rotatably thereto a disc 7 formed with gear teeth on its periphery meshing with the output pinion 8 of a synchronous electric motor (not shown) which constitutes the primary source of drive. The spring arbour for the spring (not shown) of the barrel 3 is constituted by a sleeve 9 secured to the disc 7 and rotatably mounted on a sleeve 10 integral with the disc 4 mounted at the other end of the barrel. The mainspring inside the barrel is anchored to the spring arbour 9 so that the synchronous motor, whenever it is running, winds the mainspring, the outer end of which has a slipping connection in well known manner with the interior of the barrel 3 whereby, although the spring can carry around the barrel, overwinding by the synchronous motor is prevented.

The disc 7 driven by the synchronous motor has secured thereto a ring 11, the inner cylindrical periphery of which transmits the drive as shown clearly in Figure 3 through three toggles 12 (pivoted to a plate 13) to a plate 14 which is fast with a central shaft 15 passing through the sleeve 10.

Fast with the shaft 15 on the other side of the barrel 3 there is a disc 16 fitted with a pin 17 which transmits the primary drive to the output member consisting of a sleeve 18 and a disc 19 secured thereto, the pin 17 working with play in a slot 20 of the disc 19 and the output member being rotatable on a part of the central shaft 15. The sleeve 18 of the output member has secured thereto in this particular example a time dial (not shown) the latter being the actual driven member which it is the object of the power transmission device to operate. It will be seen that the primary driving train consists of the gear disc 7, the toggles 12, the plate 14, the shaft 15, the disc 16, pin 17, the latter engaging in slot 20 of the output member disc 19. The means ensuring unidirectional drive in this transmission train consist of the toggles 12, which will transmit drive to the output member 18, 19, when the synchronous motor is running.

The disc 4 connected to the barrel 3 has secured thereto a ring 21, the inner cylindrical periphery of which is capable of transmitting drive to the output member 18, 19 through a toggle 22 pivoted to the disc 19 of the output member. Should the primary source of drive, namely the synchronous motor fail, the speed of the output member would momentarily be reduced below that of the barrel 3 and thus the ring 21 of the latter would move the toggle 22 into operative position and thus take over the drive, obtaining its power to do so from the spring (not shown) in barrel 3.

It will be clear from the foregoing how the primary and secondary sources of drive will act upon the output member and how the drive of the latter is maintained, either from one or the other source of drive.

The means provided for preventing the output member from overrunning its drive will now be described.

The disc 19 of the output member has pivoted thereto at 23 an anti-overrun toggle 24 and the primary driving disc 16 has a housing slot 25 therefor. The outer end of the toggle 24 is shaped as part of a true circle and the outer end of its housing slot 25 is made with two flat faces 26 which snugly engage the said circular part of the toggle so that the latter can pivot therebetween. This arrangement can be clearly seen in Figures 2 and 4 to 6. Assuming that the secondary drive from the clockwork motor is operative, the barrel 3 and its ring 21 will run at a certain speed and owing to the drive transmitted through the toggle 22 to the output member 18, 19 the latter will run at the same speed and the toggle 24 will drag round the disc 16 also at the same speed. Assuming now that for some external reason the output member overruns its drive, it will momentarily rotate faster than the disc 16 and the pivot 23 will cause the toggle 24 to rock about its circular end between the faces 26 of the slot 25. This causes the toggle to straighten up sufficiently to lock together the output member 18, 19 and the barrel 3 and thus the output member cannot rotate any faster than the barrel and in fact cannot overrun same.

The operation of the anti-overrun device has been described in conjunction with the secondary source of drive, but it will be obvious that the device will operate in the same manner in conjunction with the primary source of drive, although the output member will again be locked to an element of the secondary driving train. This, however, will be quite in order as the speed of said element will always be slightly below that of the drive derived from the primary source, the secondary drive being controlled to give this effect by the escapement which will be purposely regulated to run slightly slow.

An anti-overrun toggle similar to that described could be pivoted on the disc 13 and have a housing slot similar to 25, 26 in the disc 14 to co-operate with the inner surface of the ring 11.

Figures 4 to 6 show the various positions of the parts in various phases of operation.

Figure 4 shows the position of the parts when the secondary drive is operative as indicated by the arrow on the ring 21. The ring 21 of the barrel 3 has engaged the secondary drive transmitting toggle 22 and thus drive is transmitted to the output member 18, 19 as described. The chain dotted lines show that the angle between a radius drawn through the pivot of toggle 22 and the centre line of the toggle is small, i. e. ring 21 tends to straighten up toggle 22 and so the drive is transmitted. The anti-overrun toggle 24 is inoperative as shown by the comparatively large angle between a radius drawn through its pivot and its centre line. It will also be appreciated that owing to the connection between the disc 16 and 19 afforded by the toggle 24 the disc 16 is being dragged along at the same speed as that of the barrel 3 and the output member, the stud 17 of the disc 16 making contact with the leading edge of the slot 20 in the disc 19.

Figure 5 shows the position of the parts when the output member has attempted to overrun its drive, i. e. the barrel 3, which is equivalent to a drive on the plate 19 in the direction of the arrow. Owing to the ensuing relative rotation between the discs 19 and 16 the anti-overrun toggle 24 has tended to straighten up as explained above and as will be seen from the reduction in the angle between the radius drawn through its pivot 23 and its centre line. Thus the output member has locked itself to the barrel 3 and overrun has been prevented. It will also be perceived that due to the toggle action previously described it is also impossible to reverse the direction of the output member by external effort. It will also be observed that the pin 17 now makes contact with the trailing edge of the slot 20 and the secondary drive transmitting toggle 22 is now trailing as is shown by the increase in the angle between the radius drawn through its pivot and its centre line.

Figure 6 shows the position of the parts when the primary source of drive is in operation. Drive is transmitted as described by the stud 17 of the primary driving disc 16 to the disc 19 of the output member by virtue of the pin 17 making contact with the leading edge of the slot 20 and thus transmitting the drive. Both the secondary drive transmitting toggle 22 and the anti-overrun toggle 24 are trailing and inoperative as shown by the angles illustrated in this figure and described above.

In another example of anti-overrun device, the toggle 24 and its housing slot 25, 26 may be substituted by a ball and an inclined pocket in the disc 16 as will be readily appreciated by those skilled in the art.

By the arrangement described the synchronous motor can drive the output member independently of the clockwork motor and the latter member may be braked and automatically released should the synchronous motor or its current fail, or the barrel of the clockwork may go continuously as long as its speed is slightly under that of the synchronous motor in order not to take up the drive till wanted. A one way clutch or free-wheel is preferably inserted between the synchronous motor and the geared disc 7 in order that the mainspring may be wound up by hand if desired.

I claim:

1. A power transmission mechanism comprising an output member, a first source of power, a driving connection between said first source of power and said output member including one-way clutch means whereby said first source of power is effective to drive said output member in one direction and whereby said output member is free to overrun said first source of power, a normally inactive second source of power, a driving connection between said second source of power and said output member including one-way clutch means whereby said second source of power when active is effective to drive said output member in the same direction as said first source of power and whereby said output member is free to overrun said second source of power, means whereby said second source of power is rendered effective to drive said output member by failure of said first source of power, and means also included in one of said connections to prevent the output member from overrunning the source of power that is active in driving said output member.

2. A power transmission mechanism as set forth in claim 1 in which the means preventing the output member from overrunning the source of power that is active in driving the same comprises a normally inactive one-way clutch means operable by tendency of the output member to overrun the source of power that is active in driving said output member to lock said output member to said active power source against overrunning of said active power source by said output member.

3. A power transmission mechanism as set forth in claim 1 in which the second source of power comprises a spring motor constituting part of the driving connection between the first source of power and the output member and constructed and arranged to be energized by the first source of power when the latter is active in driving the output member.

4. A power transmission mechanism as set forth in claim 1 in which the means preventing the output member from overrunning the source of power that is active in driving the same comprises a toggle lever between the output member and an element of the driving connection between said output member and one of the sources of power, and in which said toggle lever is arranged to be inoperative while the speed of the output member does not exceed the speed of said element and is rendered operative to lock said element and said output member together by tendency of the output member to overrun said element.

BEVAN GRAHAM HORSTMANN.